Dec. 9, 1969  G. B. FINKE  3,483,498
HIGH PERMEABILITY MINIATURE TRANSFORMERS AND INDUCTORS
Filed April 12, 1968  4 Sheets-Sheet 1
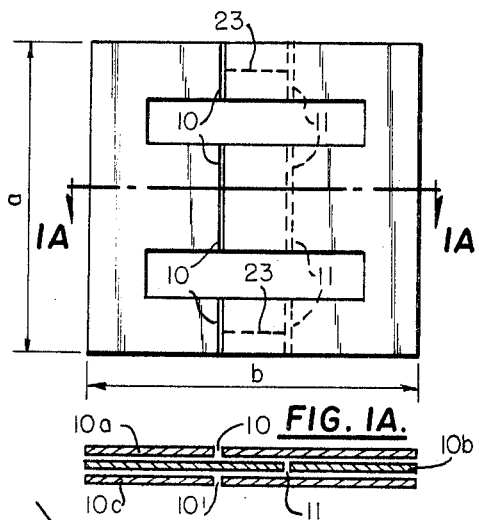
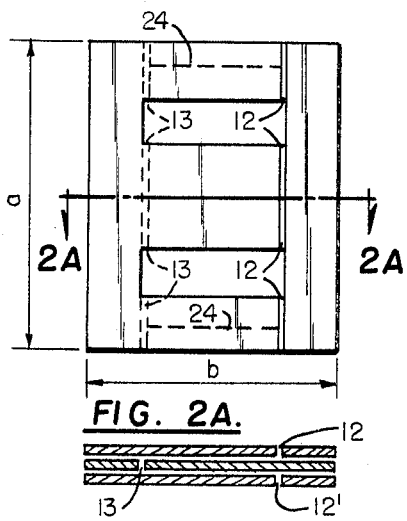
Prior Art
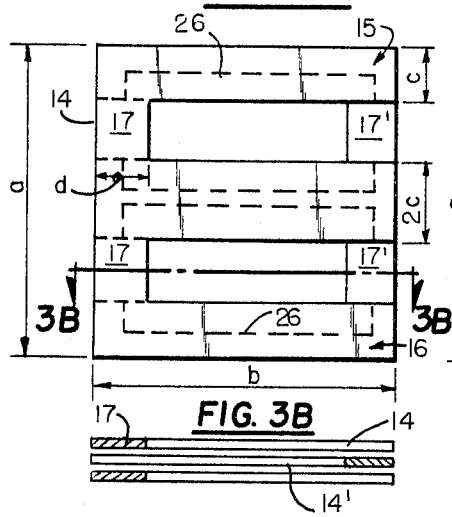
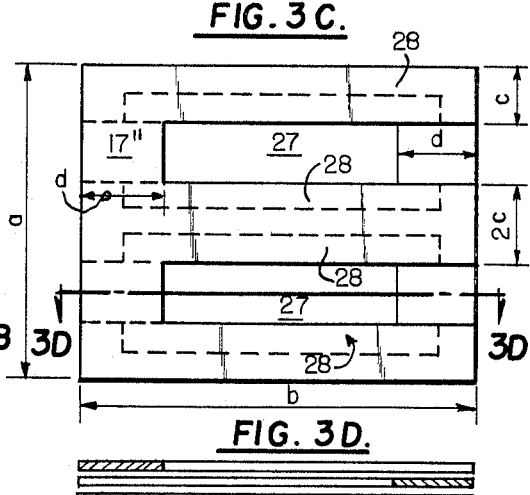
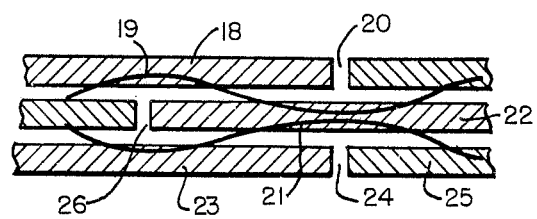
INVENTOR
Günter B. Finke
BY [signature]
HIS ATTORNEY Dec. 9, 1969  G. B. FINKE  3,483,498
HIGH PERMEABILITY MINIATURE TRANSFORMERS AND INDUCTORS
Filed April 12, 1968  4 Sheets-Sheet 3

Effect Of Material Permeability On Impedance Stack Permeability For Different Sizes Of LE Laminations Effect Of Material Permeability On Impedance Stack Permeability For Different Sizes Of EE Laminations INVENTOR
Günter B Finke
BY George Vander Sande
HIS ATTORNEY INVENTOR
Günter B. Finke
BY (signature)
HIS ATTORNEY

United States Patent Office 3,483,498
Patented Dec. 9, 1969

3,483,498
HIGH PERMEABILITY MINIATURE TRANSFORMERS AND INDUCTORS
Günter B. Finke, Cherry Hill, N.J., assignor to Magnetic Metals Company, Camden, N.J., a corporation
Filed Apr. 12, 1968, Ser. No. 720,937
Int. Cl. H01f 27/24
U.S. Cl. 336—215　　　　　　　　　　　　　　　5 Claims

ABSTRACT OF THE DISCLOSURE

The disclosure relates to improvements in miniature transformers and inductors making possible an increase in permeability of as much as one hundred percent, or more, thereby making possible a substantial decrease in size. The improvements involve, principally, an improved lamination shape for the magnetic core, the use of magnetic materials having a permeability, at an induction of forty gauss, in excess of forty thousand, a lamination thickness of about six to about twenty mils, and a gap between adjacent laminations of less than one-half mil.

BACKGROUND OF THE INVENTION

In the manufacture of small size transformers and inductors, it is quite often the goal to provide as high a permeability of the laminated stack of magnetic material as possible in order that small signal currents will produce the maximum flux change, and thereby provide the largest possible output signal. To accomplish this objective, it is known, first of all, that the magnetic core upon which the windings are wound should be formed of thin laminations rather than a solid magnetic material, and the reason for this is to reduce eddy currents in the core and thus the losses resulting from eddy-current flow.

Another consideration in achieving this objective is to minimize air gaps in the magnetic flux path of the magnetic core, and this can, of course, be best achieved by utilizing a design for the laminations of the core which does not have any air gap at all. Such a design produces difficulties, however, which are primarily concerned with the winding of a coil about such a magnetic core. Actually, two winding operations must take place, with the wire which is to form the coil first being wound around a split arbor and then rewound from the arbor to the magnetic core. Such a procedure greatly increases labor costs and introduces still further problems in that the amount of wire first wound around the arbor must exactly equal the amount which is subsequently to be wound around the core otherwise if not enough is provided, an additional length must be soldered onto the original length and, if too much is provided, it then becomes impossible to open the arbor and thus remove it from the core. In any event, the various problems which arise in connection with the winding of ring cores have resulted in far greater commercial emphasis being placed upon magnetic devices formed of laminations which provide split magnetic paths.

When the magnetic core has a split magnetic path in each lamination, the magnetic reluctance of this magnetic flux path is very much greater than when there is a closed magnetic flux path, and the reason for this is, of course, the very much lower permeability of the air gap, which is 1.0 for air as opposed to 40,000 or 60,000 or so, or even more, for the high permeability materials which are quite commonly used. Consequently, any air gap, no matter how small, substantially reduces the permeability of a stack of laminations to a value which is significantly below the permeability of the magnetic material itself.

It has long been known that in the assembly of laminations in a stack, the air gaps in the successive laminations should not be disposed one above the other when one desires to have the permeability of the stack as high as possible, but should instead be staggered. When the laminations are not staggered, the stack permeability, in addition to being low as just described, is also remarkably independent of the material permeability, and such stability may at times be considered more important than a high stack permeability. However, other than for this special design, it is well-known that it is desirable to arrange the laminations so that the air gaps in successive layers are staggered.

Staggering of the butt air gaps is quite frequently accomplished by forming what is commonly known as "EE" laminations and "EI" laminations, where each letter in the designation refers to the shape of a respective part of the two portions comprising a single layer in the stack. In forming the stack, the two members are reversed in position in each successive layer to avoid having the air gap in one layer directly above the air gap in either adjacent layer.

The formation of a magnetic core from EE and EI laminations in the manner just described, although producing a substantially higher stack permeability than when the air gaps all are superposed above each other, nevertheless produces a stack permeability which is significantly less than that of the material. Moreover, it has been found that this is particularly true for magnetic cores of small dimension, as will subsequently be shown. This factor raises serious problems in the miniaturization of transformers and inductors, because of the difficulty in obtaining sufficiently high permeabilities when the sizes of the components are reduced, and it has been found that this particular factor becomes especially acute in very small sized transformers and inductors where the sum of the length and breadth dimensions of the magnetic core is less than about two and one-half inches.

It has also been discovered that when magnetic cores are formed out of the usual EE and EI, or similarly shaped, laminations, and where the sizes of the individual laminations are again quite small, the over-all permeability of the laminated stack is not appreciably increased by selecting a material of high-permeability. In other words, it is found that differences in permeability of the material do not produce commensurate differences in the permeability of the over-all stack, and this factor becomes more and more significant as the size of the core is reduced.

As a result of my recognition of the multitude of factors affecting the permeability of the stack laminations in small transformers and inductors, I have found it possible to produce a magnetic core having a permeability which is as much as 100% greater or even more, depending on core size, than that now available from cores of the same size, and I have also found that it is possible, in the alternative, to produce a core having the same permeability as those presently available in the art, but with a size which is only one-half that, or less, of those heretofore available. I have also found that these advantages are by no means theoretical, since the actual test results of magnetic cores built in accordance with the invention have shown that the theoretical results can readily be achieved in practice.

Described briefly, the present invention includes, in combination, the use of an improved lamination shape, the formation of the laminations from a material of very high permeability, the stacking of the laminations with a very small air gap between laminations, and the use of a thin material for the laminations themselves. More specifically, in transformers and inductors where the size is such that the sum of the length and width of the individual laminations is less than about two and one half inches, I have found that laminations having a shape characterized as a "LE" or "DE" (as described hereinafter) together with a material permeability for the laminations of 40–60,000 or more (measured at 40 gauss), with an air gas between laminations less than one-half mil, and with the laminations having a thickness between six and twenty thousandths of an inch, that the foregoing results can be obtained, i.e. an improvement in permeability of as much or more than 100%.

BRIEF DESCRIPTION OF THE DRAWINGS

In describing the invention, reference will be made to the accompanying drawings, in which:

FIGURES 1 and 1A are plan and side views respectively of a lamination stack formed of so-called EE laminations;

FIGURES 2 and 2A are plan and side views of a stack of EI laminations;

FIGURES 3 and 3A are plan and side views respectively of a stack of laminations of a type designated herein as LE laminations;

FIGURES 3C and 3D are plan and side views of a stack of laminations of a type designated herein as DE laminations;

FIGURE 4 is a cross-sectional view of stacked laminations showing the path of the flux and its relationship to the air gaps occurring in each lamination;

DESCRIPTION OF THE PREFERRED EMBODIMENTS

Figure 5:
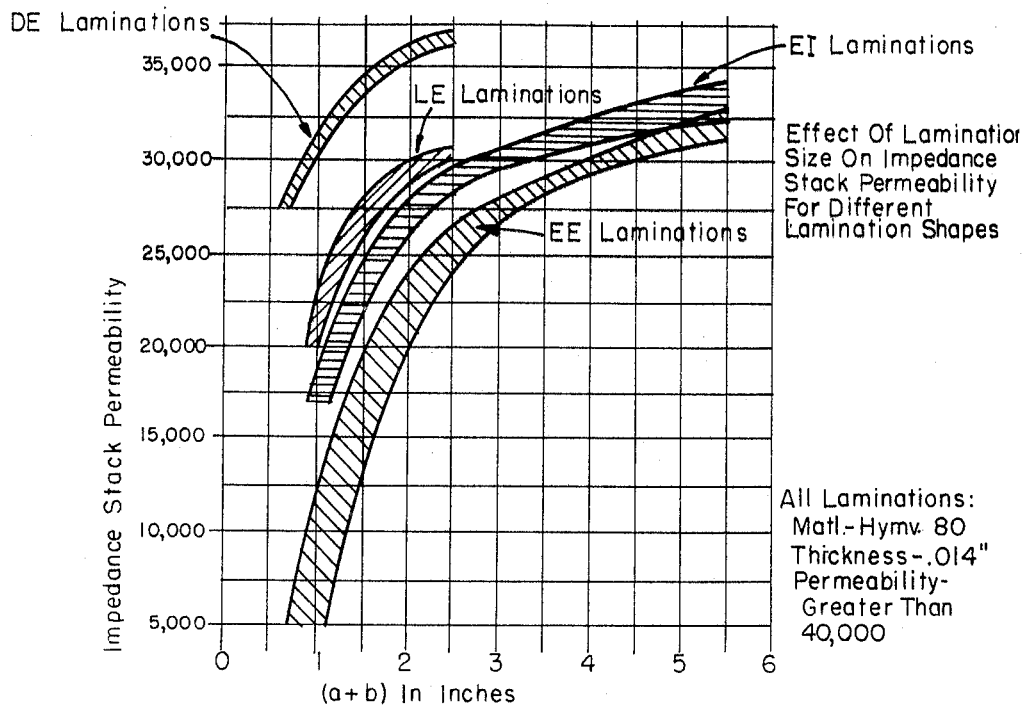
FIGURE 5 is a graph which illustrates the effect of lamination shape on the permeability of a stack of laminations and particularly illustrates the significance of lamination shape when the laminations are of small size.

As stated above, it is well known to form a magnetic core of split laminations, so that, in effect, each layer is formed of two assymetrical portions which are reversed in position in adjacent layers with the result that the air gaps where the two portions join do not overlap each other in the adjacent layers. Representative of such types of transformer and inductor laminations are the EE and EI laminations, such as are illustrated, for example, in FIGURES 1, 1A, 2 and 2A of the drawings.

In FIGURE 1, which illustrates the well-known EE type lamination, both the left-hand and right-hand portions of each two-part lamination are E-shaped. FIGURE 1A, which illustrates three such laminations placed one on top of the other, shows the staggering of the air gap in the sucessive laminations. Thus, the air gap in the topmost lamination 10a ocurs at 10 and in the third lamination 10c at 10; whereas the air gap in the middle lamination 10b occurs at 11.

FIGURES 2 and 2A illustrate an EI type lamination, and it can be noted that, in accordance with FIGURE 2A, the spacing between the air gaps in the sucessive laminations is considerably greater than for the EE type lamination of FIGURE 1. This is true even though the overall size of the lamination of FIGURE 2 is smaller than that of FIGURE 1. Thus, as FIGURE 2A shows, the air gap in the topmost lamination occurs at 12, whereas the air gap in the next lower lamination occurs at 13. In the third lamination from the top, the air gap occurs again at 12.

FIGURES 3A and 3B illustrate the long E or LE type of lamination with which the present invention is particularly concerned. The outstanding difference of this type of lamination as opposed to the EE or EI types of laminations is that each lamination or layer in the stack consists of but a single piece, and no attempt is made to provide a closed magnetic path in any one single layer of the stack. Thus, each layer of the stack includes only the single long E or LE type lamination, and alternate layers are reversed in position, so that, in effect, the magnetic circuit for the lamination of any one layer of the stack is completed only through the immediately adjacent laminations. More particularly, in FIGURES 3A and 3B, the topmost lamination 14 is shown as being formed with legs 15 and 16 which are joined at 17 but are not joined at their opposite ends. The adjacent lamination 14' is of identical shape but is reversed in position so that its portion 17' joining legs 15' and 16' is at the opposite end of the stack.

Although the long-standing knowledge in the field of magnetic core design would suggest the desirability of providing a complete magnetic path in each lamination, as is the case in the EE and EI laminations, recently developed theory supports the proposition that the LE laminations are capable of producing improved results. Thus, in 1960, Pfeiffer and Brenner explained in a theory published in the German publication, "Frequenz," vol. 14, page 167, how the flux passes over the air gap in overlapping stacked laminations. The theories of Pfeiffer and Brenner have proved to be in excellent agreement with actual experimental results, and clearly establish the superiority of LE and DE type laminations.

The substance of the Pfeiffer and Brenner theory can be explained in connection with FIGURE 4. FIGURE 4 illustrates, in greatly magnified form, several successive laminations, each having an air gap where the two portions of the lamination are butted together. In the past, it has been assumed that the magnetic flux in any one lamination stays for the most part in that lamination and bridges the gap between the butting portions of the lamination. It is for this reason that it has been considered desirable that the gap of the abutting laminations be made as small as possible. According to the theory of Pfeiffer and Brenner, however, the flux in any one lamination does not, for the most part, travel through the air gap, but instead passes at the region of an air gap into an adjacent lamination, and then back again into the first-mentioned lamination. Thus, referring to the uppermost lamination 18, the magnetic flux represented at 19 does not, according to Pfeiffer and Brenner, bridge the air gap 20, but instead crosses the gap between the adjacent laminations 18 and 21, and thus in effect circumvents the gap by passing through the lamination 22. Similarly, the magnetic flux in the bottommost lamination 23 does not bridge the air gap 24, but instead crosses over into the lamination 21, subsequently crossing back again into the adjacent lamination 25.

Based upon this assumption, Pfeiffer and Brenner evolved mathematical formulae which show that the magnetic reluctance of the stacked laminations is a function of the overlap length of the air gaps in adjacent laminations. In other words, referring to FIGURE 4, the permeability of the stack is a function of the lateral separation between air gap 20 and air gap 26, and the air gap between the lamination layers 18 and 22.

Since the permeability of the stack is thus related to the overlap of the air gaps in adjacent laminations, it follows from this that the EI laminations will necessarily have an higher permeability than an EE lamination, other factors being equal. It follows also that the long E or LE laminations as shown in FIGURE 3A will have a still higher permeability since, as can be seen from FIGURE 3B, there is no butt air gap in any one lamination and, therefore, the effective path length of the flux in any one lamination extends over the length of the legs of the "E" before it is required to cross over into an adjacent lamination. This flux path is significantly longer than for either the EE or EI stacked laminations.

In fact, as shown in FIGURE 3A, the effective path length of the flux in any one lamination is represented approximately by the dot-dash line 26, which is substantially longer than the flux path 23 in FIGURE 1 for the EE-type laminations, and also greater than the flux path 24 in FIGURE 2 for the EI-type laminations.

Still another type of improved lamination is shown in FIGURES 3C and 3D, which illustrate a modified LE type lamination, having a double base width, which is therefore designated herein as a "DE"-type lamination. The base portion of both the LE and DE laminations is illustrated as having the dimension "$d$" in FIGURES 3A and 3C respectively. In FIGURE 3A, the dimension $d$ substantially equals the dimension $c$, which is the width of the top and bottom legs of the E-shaped lamination. In both FIGURES 3A and 3C, the center leg of the lamination is shown as having a width approximately $2c$ or twice the width of either the top or bottom leg portions.

When a coil is wound about the middle leg of $2c$ width, the magnetic flux in the upper and lower legs of the E passes through the center leg and since the flux from both of the upper and lower legs passes through the single center leg of each E-shaped lamination, it is apparent that twice the flux passes through the center leg as opposed to the upper or lower legs. It is for this reason that the center leg is provided with a width which is approximately twice that of either of the upper or lower legs in order to avoid flux density saturation. This is true not only of the LE laminations, but also of the DE, EE, and EI laminations.

Because of the particular characteristics of the LE and DE laminations, by means of which an incomplete magnetic path is provided in any one lamination, it is apparent that in the portion 17 of any one LE-type lamination, i.e., the portion which joins the either leg of the E with the wider central portion of the E, there will be approximately twice as much flux as there is in the upper or lower leg of the E, and the reason for this, of course, is that this portion must additionally carry the flux from both the adjacent laminations; consequently, there is a tendency at high levels of flux density, for the laminations to reach magnetic saturation in the region 17 and 17' and this has the tendency to drastically lower the permeability of the stack at high flux densities. Saturation at high levels of flux density can still be avoided by use of the DE-type lamination shown in FIGURES 3C and 3D. In FIGURE 3C, the dimension $d$ is twice as large as the dimension $c$ so that the portion 17" can readily accommodate the flux from the adjacent laminations without saturating. If this is done, and if it is desired that the coil-receiving aperture 27 have the same length as an LE-type coil of the same nominal size, so that a coil of the same size can be placed therein irrespective of whether LE or DE-type laminations are used, then the over-all length $b$ must be increased by twice the amount by which the dimension $d$ has been increased. This results in a substantial increase in the overlap length, as can be seen by comparing the dot-dash line 28 of FIGURE 3C with the dot-dash line 26 of FIGURE 3A. Since the laminations of FIGURE 3C are the same dimensionally as those in FIGURE 3A, other than for dimensions $d$ and $b$, it can be appreciated that there is significant increase in the overlap area and an decrease in the reluctance of the portion 17" in the DE laminations, as opposed to the LE laminations. This should, and does, result in an increase in stack permeability.

I have found that the factor of lamination shape varies in importance in inverse relationship to lamination size. Thus, FIGURE 5 illustrates the effect of lamination shape on stack permeability and illustrates the increasing importance of this factor for laminations of small size. The graph of FIGURE 5 illustrates the relationship between stack permeability to the factor of the sum of $a+b$, where "$a$" and "$b$" are, respectively, the width and breadth of each lamination as shown, for example, in FIGURES 3 and 3A. The lowermost envelope of FIGURE 5 represents the EE type lamination, the middle envelope represents EI laminations, the next envelope represents LE laminations and the topmost envelope is for the DE laminations. In each case, an envelope is shown instead of a single curve. The reason for this is that for any one value of $a+b$, different overlap lengths are possible, thereby resulting in correspondingly different values of impedance stack permeability. It can be seen that for higher values of the factor $a+b$, i.e., where $a+b$ is 2.5 inches or more, the stack permeability is not greatly different between the EE, EI, LE, and DE laminations. FIGURE 5 also clearly illustrates, however, that the different types of laminations provide significantly different values of stack permeability when the factor $a+b$ is less than about 2.5 inches. Thus, when the factor $a+b$ is about one inch, it can be seen that the stack permeability of the EE laminations is in the order of 10,000, in the order of 17,000 for EI laminations, and about 22,000 for the LE type laminations. For the DE-type laminations, the stack permeability is about 30,000.

Figure 6:
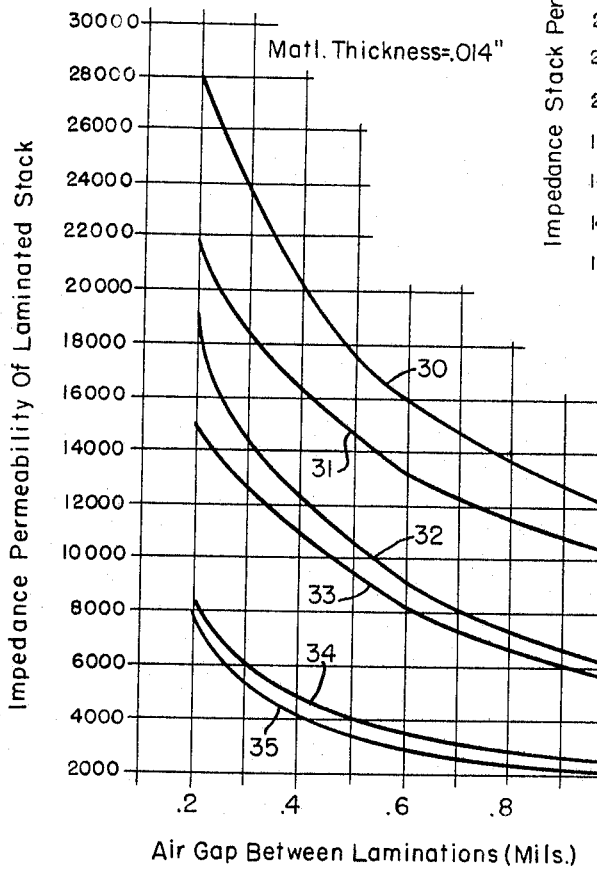
FIGURE 6 is a graph illustrating the relationship between stack permeability and air gap for "EE" type laminations and illustrating particularly the minor importance of an increase in material permeability in the case of small-sized laminations.

I have also found that differences in material permeability do not produce corresponding differences in stack permeability in the case of EE and EI laminations. Thus, FIGURE 6 illustrates the relationship between stack permeability and air-gap between laminations for various size laminations and for different values of material permeability. Thus, the two curves 0 and 31 are both of laminations where the factor $a+b$ is 1.75 inches. Curve 30 is a plot of stack permeability as related to the air gap between laminations, for a material permeability of 60,000; curve 31 is for the same conditions, except that the material permeability is 40,000. It will be noted that there is a substantial distance between these curves in the vertical direction, thereby establishing that for laminations of this larger size, there is some measurable gain resulting from use of a material of higher permeability. Curves 2 and 33 are for somewhat smaller sized laminations where the sum of $a+b$ is .9375 inches. Curve 32 represents the plot for the material of 60,000 prmeability, whereas curve 33 is for a material of 40,000 permeability. It will be noted that there is substantially less distance in a vertical direction between the curves 32, 33 than between curves 30, 31, thereby indicating that less improvement in stack permeability will result in selecting a material of higher permeability when the laminations are of the EE type. The extreme in FIGURE 6 is reached where the sum of $a+b$ is .75 inches, as represented by curves 34, 35. It can be seen from curves 34, 35 that for laminations of this small size, very little improvement in stack permeability is gained by selecting a material of substantially higher permeability.

Figure 7:
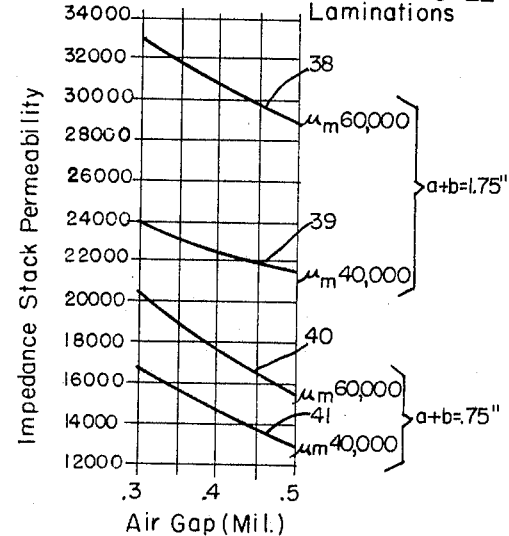
FIGURE 7 is a graphical illustration which corresponds generally to FIGURE 6, but relates particularly to the LE-type laminations and shows the difference in result obtained when using laminations of that shape.

FIGURE 7 comprises a family of curves which are similar in nature to those of FIGURE 6, but differ therefrom in that they are for the LE type laminations. Since the respective pairs of curves tend to overlap in the case of LE laminations, only two pairs of curves are shown in FIGURE 7, one pair 38, 39 being for LE laminations of a size for which $a+b$ equals 1.75 inches, and the other pair 40, 41 being for laminations in which $a+b$ equals .75 inches. These two pairs correspond, respectively, to the largest and the smallest laminations whose characteristics are graphically illustrated in FIGURE 6, and it should be understood that laminations of intermediate size, represented in FIGURE 6 by the pair of curves 32, 32 lie intermediate the two pairs of curves 38, 39, and 40, 41 of FIGURE 7.

It can be seen that for each pair of curves, such as curves 38, 39, for laminations of a particular size, there is an appreciable increase in stack permeability when the material permeability is 60,000 as compared to 40,000. Although the increase again is more significant for the large sizes of laminations, as shown by the longer vertical separation between curves 38, 39 than between curves 40, 41, it will be noted that even for the smaller-sized laminations represented by the pair of curves 39, 40, there is a significant gain in stack permeability in using the higher permeability material, i.e., 60,000 as opposed to 40,000.

Figure 8:
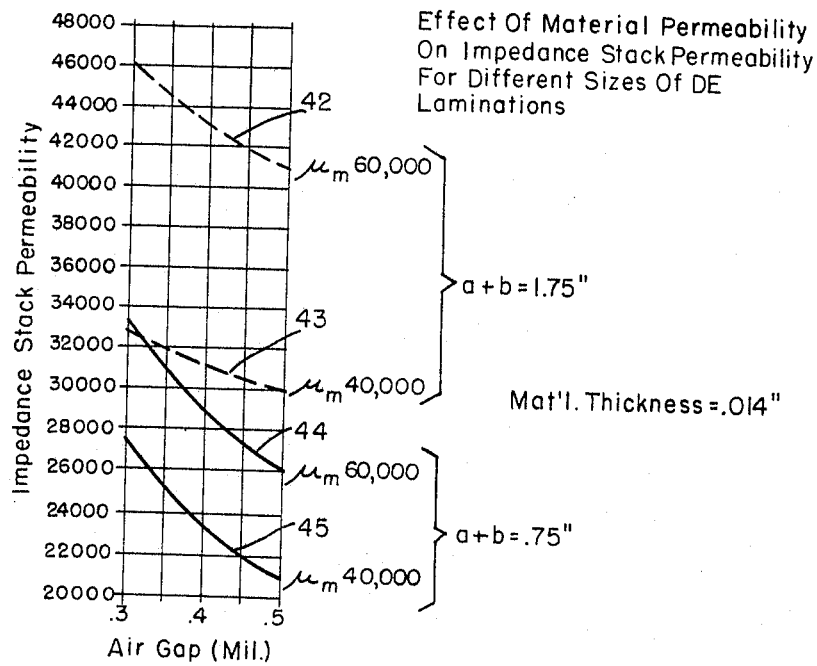
FIGURE 8 is a graphical illustration which corresponds generally to FIGURE 6, but relates particularly to the DE type laminations.

Similarly, FIGURE 8 illustrates graphically the effect of material permeability on impedance stack permeability for different sizes of DE laminations, and thus corresponds generally to FIGURES 6 and 7, except that the curves of FIGURE 8 are particularly for the DE-type laminations. Here again, only two sets of curves are shown, the upper two curves 42, 43 being for laminations of a size such that $a+b$ equals 1.75, and the two lower curves 44, 45 being for a smaller lamination where the factor $a+b$ equals .75. Also, of the two curves 42, 43, curve 43 is for a lamination having a material permeability of 40,000, whereas curve 42 is for a material of 60,000 permeability. As to the two curves 44, 45, curve 45 also is for a lamination formed of a material having a material permeability of 40,000, while curve 44 is for a material of 60,000 permeability. In both instances, the vertical separation between the two curves of a pair in FIGURE 8 is significantly greater than in FIGURE 7, thereby illustrating that material permeability is a significant factor with the DE-type laminations, more so than for the LE-type laminations.

Figure 9:
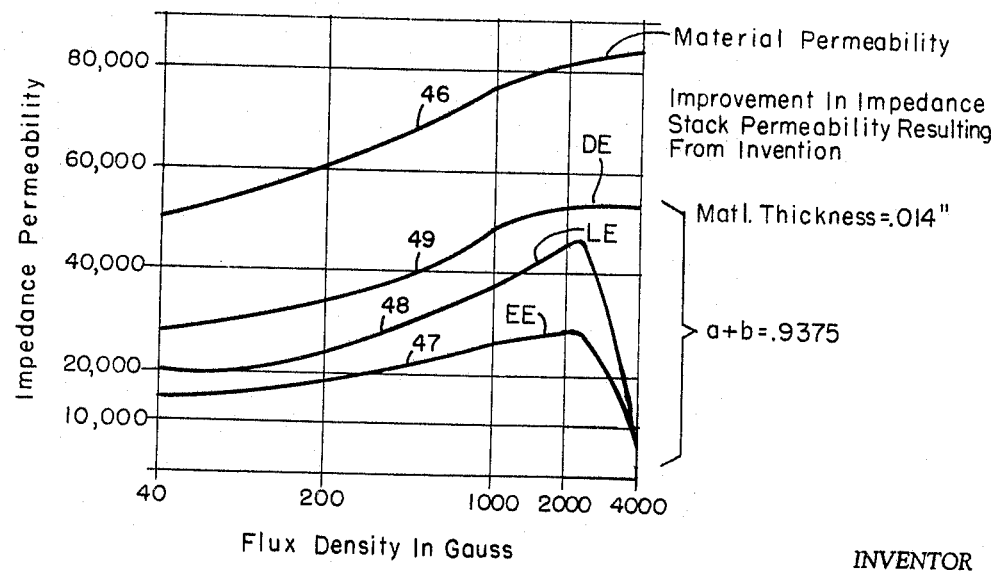
FIGURE 9 is a graphical illustration showing the relationship between permeability and flux density and illustrating also the effect on this relationship of different lamination shapes.

The graph of FIGURE 9 graphically illustrates the relationship between impedance permeability and flux density represented in gauss for different lamination shapes. The material impedance permeability as measured on ring laminations is shown in the topmost curve 41. The lowermost curve on the graph, curve 42, illustrates the variation in impedance stack permeability with variations in flux density for EE laminations made of the material represented by curve 41, and curves 43 and 44 show the same for the LE and DE laminations, respectively. It is evident from FIGURE 9 that the stack permeability is appreciable higher, other factors being equal, for the LE laminations as opposed to the EE laminations, and that the stack permeability for the DE laminations is still higher than for the LE laminations over the entire range of flux density.

The graph of FIGURE 9 further illustrates that even the improved LE laminations are of real utility only for flux density values of less than about 3,000 gauss, since the permeability is shown as decreasing very rapidly for the LE laminations, as well as the EE laminations when the flux density exceeds this value. The principal reason for this, as mentioned above, is the magnetic saturation of the LE laminations occurring in the portion 17 of FIGURE 3A for higher values of flux density. For the DE laminations, however, the permeability is shown as remaining at a high level, even in the region above 3,000 gauss and up to 4,000 gauss, and this, of course, is the result of having the wider portion 17' shown in FIGURE 3C which does not readily saturate at high values of flux density. FIGURE 9 further shows that the DE-type laminations provide increased permeability over the LE-type laminations even for values of flux density below 3,000 gauss. The reason for this, as alluded to previously, is the increase in overlapping flux path area of a DE lamination and a lower reluctance of the portion 17″, as compared to that of an LE lamination capable of receiving the same size coil. Such improvement is, of course, at the expense of some increase in material costs because of the larger over-all size of the DE laminations.

Although LE-type laminations have, of themselves, been known heretofore (having been illustrated in a catalogue of the Fried Krupp Widia-Fabrik Essen designated as Hyperm Weichmagnetische Werkstoffe, at Pages 24 and 25), to my knowledge no transformers or inductors have been manufactured which have fully utilized the advantages resulting from the use of such laminations. As a result, no one has heretofore designed or made transformers or inductors having a permeability as high as those which I have constructed, at least for small size inductors and transformers, where the sum of the length and breadth dimensions of the individual laminations is less than 2.5 inches. My analysis of the multitude of factors involved in the design of such laminations and the resulting cores, has led the way to an over-all design which is very significantly superior to anything heretofore available. More specifically, in the design of transformers and inductors where the sum of the length and breadth dimensions of the individual laminations is less than 2.5 inches, it is an element of my design that the laminations be of LE or DE or similar shape as described herein and formed from a material having a permeability of at least 40–60,000 measured at a flux density of 40 gauss. Still higher permeabilities may, of course, be used, and may well reach a value of 100,000 or so. In addition, an inductor or transformer designed according to the concepts of my invention should have an insulation coating on the laminations and an absence of burrs resulting from the stamping operations which permits an air gap between adjacent laminations not exceeding about 0.0005 inch. In order to obtain a high permeability of the stack, such a small air gap is necessary in order that the magnetic flux can readily cross over from one lamination to the adjacent laminations in the vicinity of an air gap.

Another important factor in the design of transformer and inductor cores of the present invention having a very high stack permeability is the use of thin material for individual laminations. Thus, I have found that a thickness in the range of .006 to .020 inch is desired, and preferably in the range of .010 to .014 inch. Transformers constructed in accordance with the foregoing criteria have been found to have an impedance stack permeability which is very much greater than has heretofore been realized.

From the description presented herein, it can be appreciated that the amount of improvement which is obtainable is a function of the size of the inductor or transformer. FIGURE 9 shows the startling improvement in results which is obtainable with an intermediate size magnetic coil where the factor $a+b$ equals .937. Thus, FIGURE 9 illustrates that, at a flux density of 40 gauss, the impedance permeability of the stack is in the order of only about 14,000 when the EE-type laminations are used. This, of course, is very much less than the material permeability at 40 gauss, which is shown as being 50,000. With use of the LE-type laminations, together with a selection of the numerous other design factors as described herein, it is readily possible to obtain an impedance permeability for the stack of about 20,000. Use of the DE laminations makes possible a still further increase, so that an impedance permeability of about 28,000 can be obtained, representing an increase of approximately 100% over the results previously obtainable. For smaller sized laminations, greater improvement is possible, and for laminations of larger size, where the $a+b$ factor is greater than .9375, somewhat less improvement is obtained. However, it will be apparent to one skilled in the art that the present invention makes possible an extraordinary improvement in results and does so in a way not heretofore contemplated, since it has previously been considered that the principal factor in obtaining high permeability in a transformer or inductor core is the quality of annealing of the material.

From the foregoing description, several additional advantages accruing from the use of EE and DE laminations will now be apparent. First of all, it now becomes possible to form a stack from laminations which are all identical in shape and size, thereby eliminating the need for manufacturing, stocking, and assembling two different pieces to form a single layer of the stack. Also, assembly is simplified, since there are no small-sized I-shaped or small E laminations which need to be handled. It can be appreciated that this presents a problem, particularly where the laminations are of very small size, as where the $a+b$ factor is less than one inch. Another outstanding advantage is that a transformer or inductor core of a given size can now be assembled from exactly one-half the number of laminations heretofore deemed necessary, since each layer in the stack is now formed of a single piece rather than two pieces. This further makes possible a simplification of assembly with lower production costs, and also results in a saving of material.

I desire it to be understood that this invention is concerned with transformer and inductor laminations which have a generally E-shaped configuration and are formed of a high permeability material. As such, the present invention is to be distinguished from U-shaped laminations which are frequently used in magnetic amplifiers in such a way that all the laminations thereof are of identical U-shaped configuration and with alternate laminations reversed in position. Laminations made for such a purpose are generally formed of a material having a rectangular hysteresis loop but are ordinarily not used where the ultimate objective is very high permeability as is the case in the present invention, where the material from which the laminations are formed has a permeability in excess of 40,000 and does not exhibit rectangular hysteresis loop characteristics.

Having described an improved design for the construction of magnetic transofrmer and inductor cores, it is my desire to be understood that various modifications and alterations may be made to the specific embodiment shown without departing from the scope of my invention.

What I claim is:

1. A magnetizable core for small-sized inductors and transformers in which the over-all width and breadth dimensions of the core do not exceed about 2.5 inches, said core comprising a stack of layers each comprising a single lamination and with all laminations of identical size and shape and alternate laminations being reversed in position, each said lamination being formed of a material having a magnetic permeability of at least 40,000 and having a configuration comprising a single base portion and three leg portions which extend transversely of said base portion, said laminations having a thickness in the range of 6-20 thousandths of an inch, and a flatness and absence of burrs and thinners of insulation coating permitting a spacing between adjacent laminations of no more than about one-half mil.

2. The magnetizable core of claim 1 in which the middle of said legs has a breadth greater than that of the other two legs and each said lamination is formed with said base portion of substantially the same breadth as the two outer legs.

3. The magnetizable core of claim 1 in which each said lamination is formed with said base portion of greater breadth dimension than said leg portions.

4. The magnetizable core of claim 1 in which each said lamination is formed with said base portion having a breadth dimension substantially twice that of said leg portions.

5. The core of claim 1 in which each lamination has a thickness in the range of about .010 to about .014 inches.

References Cited

UNITED STATES PATENTS

| | | | |
|---|---|---|---|
| 2,739,085 | 3/1956 | McBride | 336—234 XR |
| 2,849,696 | 8/1958 | Moynihan | 336—234 XR |
| 2,890,428 | 6/1959 | Sikonna | 336—215 XR |
| 3,205,561 | 9/1965 | Brutt et al. | 336—234 XR |
| 3,213,727 | 10/1965 | Schwennegen | 336—234 XR |
| 3,361,934 | 1/1968 | Hanland | 336—234 XR |
| 2,316,928 | 4/1943 | Woodward | 336—234 XR |

OTHER REFERENCES

Bozonth, "Ferromagnetism," D. Van Nogstrand Company, Inc., March 1951, pp. 870–871.

LEWIS H. MYERS, Primary Examiner

THOMAS J. KOZMA, Assistant Examiner

U.S. Cl. X.R.

336—219, 234